US012664168B1

(12) United States Patent
Breva

(10) Patent No.: US 12,664,168 B1
(45) Date of Patent: Jun. 23, 2026

(54) TECHNOLOGY SEARCH AND REPURPOSING SYSTEM AND RELATED METHODS

(71) Applicant: S1 Industries PBC, Inc., Winchester, MA (US)

(72) Inventor: Luis Perez Breva, Winchester, MA (US)

( * ) Notice: Subject to any disclaimer, the term of this patent is extended or adjusted under 35 U.S.C. 154(b) by 0 days.

(21) Appl. No.: 19/199,347

(22) Filed: May 5, 2025

Related U.S. Application Data

(60) Provisional application No. 63/642,817, filed on May 5, 2024.

(51) Int. Cl.
G06F 16/2457 (2019.01)
G06F 16/28 (2019.01)
(52) U.S. Cl.
CPC ...... G06F 16/24575 (2019.01); G06F 16/285 (2019.01)

(58) Field of Classification Search
None
See application file for complete search history.

(56) References Cited

U.S. PATENT DOCUMENTS

| | | | | |
|---|---|---|---|---|
| 12,481,666 | B1 * | 11/2025 | Jain | G06F 16/24578 |
| 2021/0303585 | A1 * | 9/2021 | Fan | G06F 16/27 |
| 2024/0281487 | A1 * | 8/2024 | Bathwal | G06F 16/24575 |

* cited by examiner

*Primary Examiner* — Eddy Cheung
(74) *Attorney, Agent, or Firm* — Jonathan D. Spangler; Jay B. Bell

(57) ABSTRACT

A technology search and repurposing system comprising a query processing system, one or more intelligent systems, a response generator, machine learning (ML) powered navigator, and a curated database. Together these elements describe a system that doubles as a system to produce new technology-problem designs and as a system/method to curate a unique kind of data. The data itself may be used to build a new kind of AI that makes it possible to search technology by intent.

11 Claims, 15 Drawing Sheets

84

| Example of the nature of the data gathered during the systematic compilation of data | |
| --- | --- |
| *Exploration data* | Technical, and functional features, application domains, Extreme use scenarios, Adjacencies and proofs of concept Value hypotheses Three or more compelling organization hypotheses |
| *References* | Papers, press releases, and relevant documents and evidence |
| *"Make it real" / make a kit* | Instructions |
| *Roadmap to Scale* | Instructions |
| *De-risking plan* | Timeline and organizational test procedures |
| *Essays* | Technology-problem essays |
| *Lists and Logs* | Assumptions, being wrong list, truth tables |

86 ⎯ *Exploration data*
88 ⎯ *References*
90 ⎯ *"Make it real" / make a kit*
92 ⎯ *Roadmap to Scale*
94 ⎯ *De-risking plan*
96 ⎯ *Essays*

Fig. 8

TECHNOLOGY SEARCH AND REPURPOSING SYSTEM AND RELATED METHODS

CROSS-REFERENCES TO RELATED APPLICATIONS

The present application claims the benefit of priority under 35 U.S.C. § 119(e) to U.S. Provisional Application Ser. No. 63/642,817, filed 5 May 2024 and entitled "Innovation Discovery System and Technology Platform Powered by Technology Repurposing, Combinatorial Innovation and a New Paradigm for Virtualized Command-and-Control Interfaces and Associated Decision Aids," the entire contents of which is hereby incorporated by reference into this disclosure as if set forth fully herein.

FIELD

The present disclosure relates generally to information systems and to technology transfer systems, and more specifically to machine learning enabled search systems and industrial design systems.

BACKGROUND

In connection with technology transfer it has become increasingly important for economic and geo-political reasons to improve upon existing methods to convert technology research into material impact and economic and industrial activity as well as making said research discoverable by non-subject matter experts. More specifically, increasing the speed and yield of existing infrastructures to materialize research has become paramount to governments and commercial organizations alike.

Various systems to translate technology to productivity are already well known. Military agencies use several engineering design processes to match technologies to families of requirements that outline specific needs identified by their operations. In the commercial sector, frameworks born out of product design like open innovation and product-startup creation frameworks have become a standard to materialize technologies as products. Amongst them methods for fast testing of consumer-based product ideas like lean Startup have been widely embraced as low-cost approaches to explore product ideas. As the processes to create and grow new startup experiments have become more industrialized, commercial methods to build startups have become moderately successful at creating wealth for investors, but the conversion of advanced technology research into economic and strategic activity remains low with yields well below 1 in 100.

A key factor preventing progress is that a vast majority of methods to translate technology to productivity require the match of a technology to a requirement/need to be self-evident. For the technology-need fit to be self-evident 1) either the researchers in question knew already about a specific business area that mapped directly to the research (this is typically the case for highly applied research) or 2) the technology advance has been known for long enough to have been taught in higher education settings for new generations to no longer think of it as an advance but as a part.

The first path explains the high failure rate of new technology endeavors—most research may have sought inspiration in a real-life problem but is typically anchored in a scientific field rather than a real-world problem—while the second explains why it takes on average more than 20 years for breakthroughs to make their way to society.

These limitations spill over to computer-based systems designed to retrieve information about technologies and research. Because the technologies are indexed by information that was available at the time of entry such as author, institution, and field to name some, current technology databases are most effective when the technology-need fit was known (i.e. self-evident) at the time of entry.

This all effectively makes most technologies "unfindable".

Until recently, conducting more, high-risk research was sufficient to build an advantage at the geopolitical peace-keeping game—no matter how much research went unused or how long it took for it to become a capability. It was a "numbers game": more people working on more research leading to more technologies that bought time and deterred adversaries. That advantage was key to promote a global economy based on commerce and innovation. Today, with Chinese science and research reaching parity of numbers with the U.S., the same numbers game will at best lead to a geo-political stalemate. Increasing access to technology and making technology searchable by intent can revert that trend and create a new advantage for democratic societies powered by commerce.

That research-by-numbers system yields now more patentable research than ever, but most of it appears doomed to the metaphorical "shelf". This has been the curse of technology innovation in the military, but also in the commercial sector, even startups. We aspire for technology innovation to create options. However, the current system constrains progress to technology-capability fits that are "self-evident"; that is, "innovations" that can be pre-specified by requirements, or hypothetical user needs, or reduced to a minimum viable product. This limiting view of technology has systematized accountability but created significant innovation waste—most technologies end up unused.

What may be less known is that for all the talk of disruption and experimentation, commercial innovation methods are limited in the exact same way. Established organizations (and startups) place a disproportionate faith in short-term predictability, resulting in an excess of failed "minimum viable" products, experiments, and services, all of which hit or miss (and none are capable of informing full systems).

The buzz around commercial innovation methods conceals another crucial fact: it takes 20-30 years for new advanced technologies to become clear enough for people to imagine products that would leverage them. Just as with the innovations attributed to DARPA. Because of that, mainstream commercial innovation methods are not only linear but also late.

This all has promoted linear thinking, the illusion of "safe" technology bets, and contributed to increasing long-term risk. The net result is a predatory view of technology and startup investing that runs counter to the lofty aspiration inked by the founding fathers for technology to become an instrument for progress.

There is, however, a vast opportunity. We have barely scratched the surface of how to usefully employ technologies already invented. The modern world was largely built because people—like those who tinkered with cars and combustion engines—had access to technology they could play with and repurpose. Today's tinkerers, though, are directed towards a never-ending string-along, beg-for money cycle. There's a solution: make technology accessible and affordable to tinker with; and trust that the diversity of purpose will lead to a combinatorial explosion of new ideas.

This hinges on learning to repurpose technologies so they don't end on the "tech shelf" but become available for rapid experimentation in new contexts, even when requirements are unknown or unknowable and the need to adapt is at its highest.

The opportunity created by advancing technology repurposing and combinatorial innovation is best explained by analogy. Consider past research programs and requirements—successful or not—as "Lego sets" (as opposed to "Lego bricks"). For example, Lego sets are presented with a precise configuration of Lego bricks and include instructions that tell the purchaser how to build the object pictured on the front of the box—i.e., how to make the Lego set achieve its intended purpose. However, innovative Lego enthusiasts know that they can disassemble and combine the parts of several different Lego sets and use the parts to build entirely new objects limited only by their imagination. The more immersed they become in the Lego pieces, the easier it becomes to see new possible combinations, and collaboration with like-minded enthusiasts makes it easier to create bigger and more imaginative builds. This mindset can be extended to current technology: What if we could innovate beyond the original intent of any project or its requirements by recombining the "parts" of these "sets" in new ways, and thus repurpose the original projects? That recombination stands to: increase exponentially the outcomes from research based organizations like the Office of Naval Research, accelerate adoption of technologies by helping create new opportunities from technology combinatorially-no matter how long a technology has been sitting underused, empower people to give new use to technologies researched by the U.S. Government or anybody else, and develop a new kind of marketplace for "try-before-you-buy" technology licenses.

Achieving these would give a new operational and strategic meaning to 'dual use'. Here we use 'dual use' to describe a situation in which a technology is given a use other than the one that motivated the research associated with it. Dual use is an outcome of repurposing; it may be commercial, in government, in another branch of the military, or within another program of a corporation to name some. Building on the earlier "Lego" analogy, making the "parts" accessible to fresh ingenuity may create a combinatorial explosion of new uses and inventions.

However, several challenges that exist to limit the efficiency of technology repurposing and combinatorial innovation include inefficiencies in the ability to locate and gather all relevant data, search through the relevant data, break the data into parts, and then reassemble those parts into a new and useful configuration. Moreover, current technologies make it more difficult to collaborate with others on such a project.

SUMMARY

The present disclosure addresses the needs in the prior art by describing a technology search and repurposing system comprising a query processing system, one or more intelligent systems, a response generator, machine learning (ML) powered navigator, and a curated database. Together these elements describe a system that doubles as a system to produce new technology-problem designs and as a system/method to curate a unique kind of data. The data itself may be used to build a new kind of AI that makes it possible to search technology by intent. By way of example, the term "technology-problem design" refers to any kind of design that explains how a technology helps solve a problem. For example, one extreme case of technology-problem design is a design for a new company, while at the other extreme is a design for a kit to explore a problem at a table scale.

In some embodiments, the present disclosure describes processes for curating the curated database. In some embodiments, the curation processes augment technology data with information that facilitates comparison of different technologies and problems. By way of example, the new information is obtained through a family of processes. In some embodiments, a first curation process decomposes the original technology into repurpose-able and recombine-able bits using a novel method based on the principles of combinatorial innovation. In some embodiments, a second curation process is configured to create hypothetical technology narratives that may be used to augment or train other artificial intelligences.

In some embodiments, the technology search and repurposing system is configured for searching by intent or purpose.

In some embodiments, the technology search and repurposing system may be configured to create an AI-based search system that leverages latent information to identify potential applications and or uses for technology even when the application or use in question is not listed in the original documentation for the technology.

In some embodiments, technology search and repurposing system may be configured so that one creative process can be used to fulfill two purposes: helping to explore the path from reach to impact (it is a lab to impact or problem to impact process), and a data creation and curation process.

BRIEF DESCRIPTION OF THE DRAWINGS

Many advantages of the present disclosure will be apparent to those skilled in the art with a reading of this specification in conjunction with the attached drawings, wherein like reference numerals are applied to like elements and wherein:

FIG. 8 is a table depicting examples of the nature of data gathered during the systematic compilation of data forming part of the exploration process of FIG. 5, according to some embodiments;

DETAILED DESCRIPTION OF A PREFERRED EMBODIMENT

Illustrative embodiments of the disclosure are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The technology search and repurposing system and related methods disclosed herein boasts a variety of inventive features and components that warrant patent protection, both individually and in combination.

Figure 1:
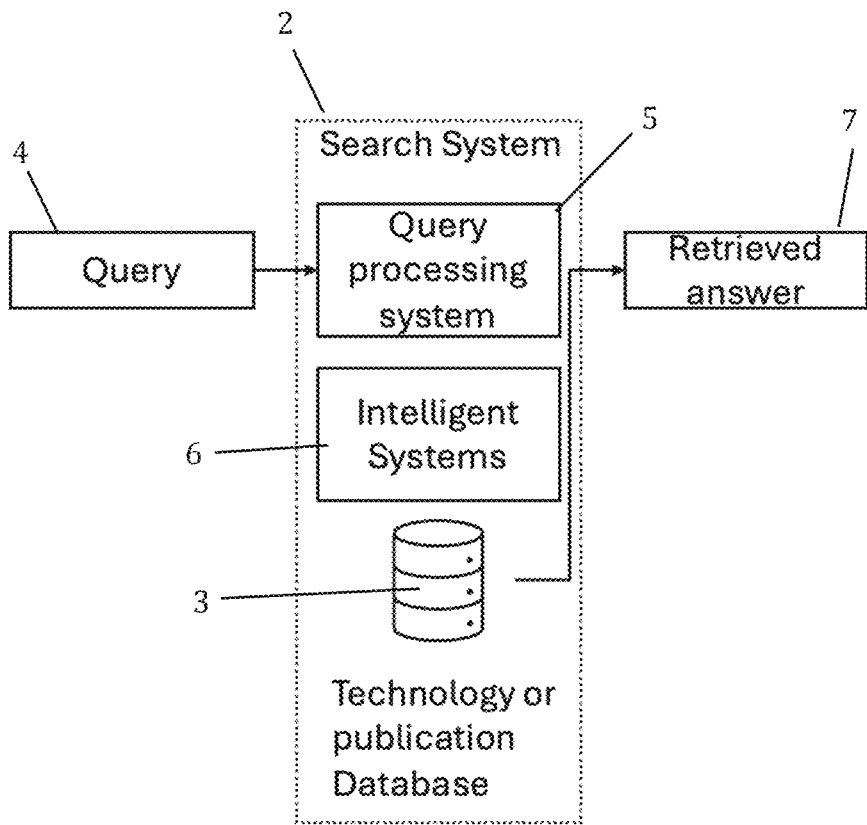
FIG. 1 is a block diagram depicting a typical prior art search system, according to some embodiments.

FIG. 1 illustrates an example of a common prior art search system 2 that may be typically used to find technologies. In most prior art embodiments, the search system 2 includes a database 3, a query language 4, and a query processing system 5, which may comprise a computing device. The database 3 is typically sorted by a set of criteria pre-specified at the time each entry was input into the database 3 and a query is built as a logical concatenation of filters that limit the range of each criteria according to the item sought. In other embodiments the database search system 2 may be augmented with a form of knowledge graph such as a thesaurus or other graphical model mapping keywords or concepts to one another. The knowledge graph can be used to expand the search by identifying adjacencies. Sometimes the knowledge graph is built using semi-automated methods like machine learning algorithms that group or cluster different entries. These augmentations are typically called intelligent systems 6. An important consideration is that no matter how advanced the intelligent system 6, the ultimate goal of these systems 2 is retrieval 7 of an original document. Thus, when used to identify innovation, these systems are limited to retrieving technologies for which the purpose was known at the time of the writing of the report. The technology search and repurposing system 10 described herein deals with the case in which the purpose itself needs to be inferred.

Figure 2:
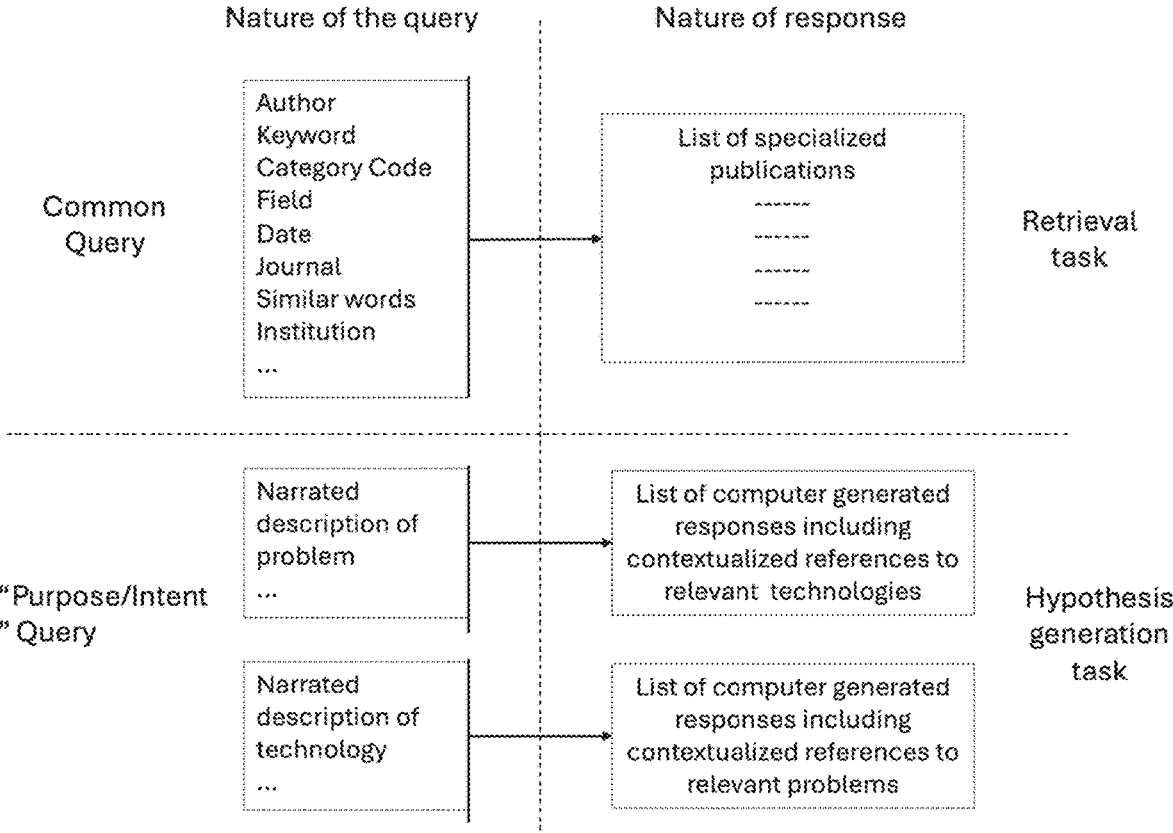
FIG. 2 is a chart comparing certain functionality of a typical prior art search system with that of a technology search and repurposing system of the present disclosure, according to some embodiments.

By way of example, FIG. 2 illustrates a comparison between the traditional form of query 2 with the kind of queries made possible by the technology search system and repurposing system 10 described herein.

By way of example, the top part of the diagram shows a common query performed by a traditional search system 2 described above with respect to FIG. 1. In most embodiments, the task performed by traditional systems 2 is best understood as a retrieval task: the search system 2 retrieves the original entries by matching the query to the content included in the entry. In such embodiments, technologies may only be found by keywords or other criteria such as field of study or proposed applications as they were described in the original technology patent, research report, or paper.

By way of example, the bottom part of the diagram describes the kind of query made possible by the technology search system and repurposing system 10 described herein. The technology or the problem can be narrated, and the technology search system and repurposing system 10 described herein is expected to generate an answer that combines one or more technologies and can point to the documents it used to generate the answer. The search task described in the technology search system and repurposing system 10 described herein is a hypothesis generation task which goes beyond mere information retrieval.

Also included in the technology search system and repurposing system 10 described herein (though not shown in FIG. 2) are more elaborate, iterative query systems common in generative artificial intelligence applications such as chatbots, virtual assistants as well as novel concepts like discovery systems that make use of spatial computing and augmented or virtual reality.

Figure 3:
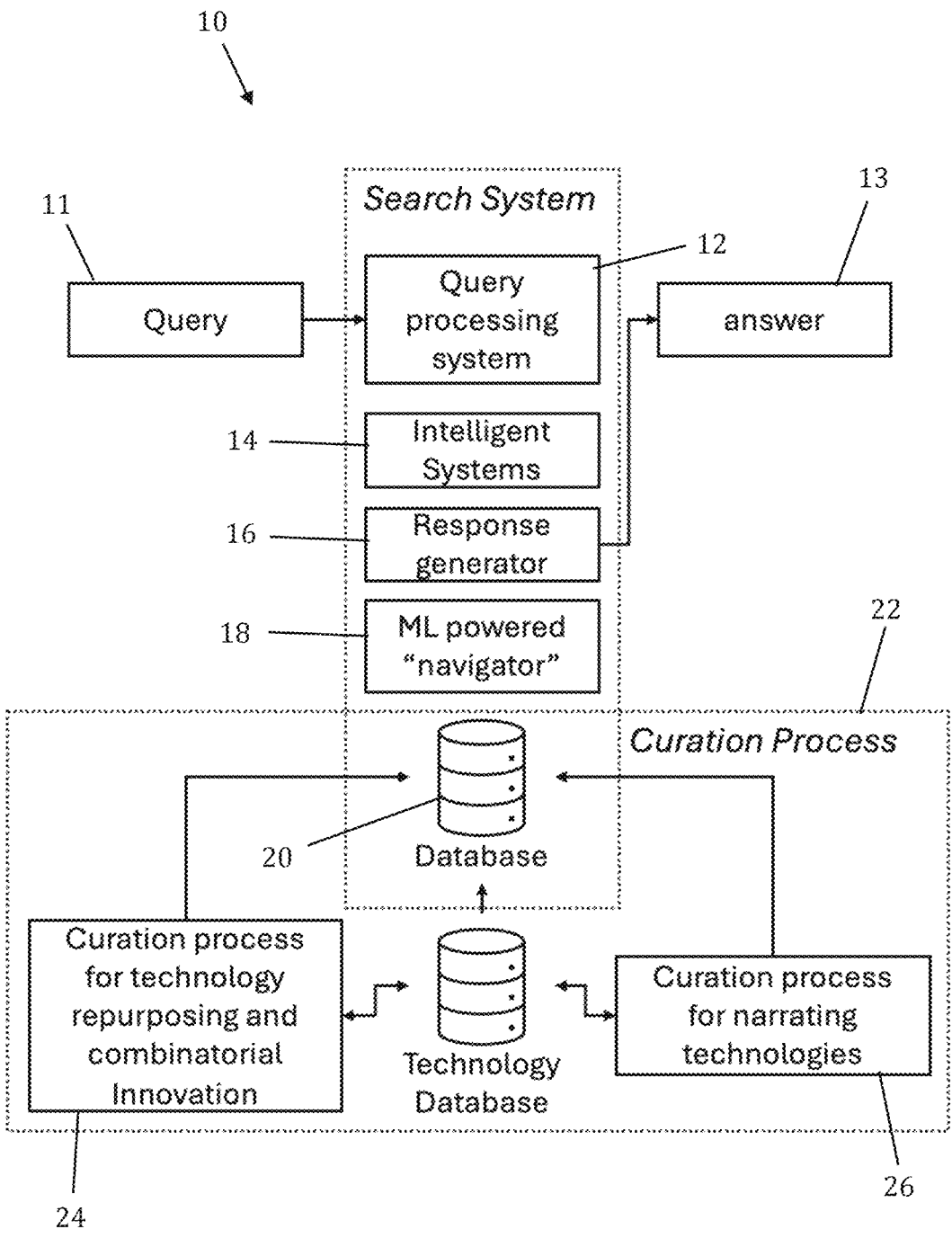
FIG. 3 is a block diagram of an example of a technology search and repurposing system of the present disclosure, according to some embodiments.

FIG. 3 illustrates an example of a technology search and repurposing system 10 according to some embodiments of the present disclosure. By way of example, the technology search and repurposing system 10 as shown is structured in a way that is similar to the general system 2 described in FIG. 1 for the purpose of comparison.

In some embodiments, the technology search and repurposing system 10 comprises a query processing system 12, one or more intelligent systems 14, a response generator 16, machine learning (ML) powered navigator 18, and a curated database 20, which may be located on a physical server or a cloud-based server. By way of example, several of the component of the technology search and repurposing system 10 disclosed herein are new intelligent components compared to the general system 2 described in FIG. 1, including but not limited to the navigator 18 that helps map a specific task to different ways to analyze the database and the response generator 16 that composes a hypothesis or list of hypotheses for how to map problems to technologies and vice versa. In some embodiments, the response generator 16 may also be tasked with assembling information for traceability purposes such as links or partial entries into the database 20.

By way of example, the database 20 used in the technology search and repurposing system 10 is also different from the database 3 commonly used in systems like those depicted in FIG. 1. Instead of using directly a traditional technology, papers, or patents database, the technology search and repurposing system 10 includes several curation processes 22 that may be performed by humans or in a semi-automated manner. These curation processes 22 augment technology data with information that facilitates comparison of different technologies and problems. The new information is obtained through a family of processes. In some embodiments, a first curation process 24 decomposes the original technology into repurpose-able and recombineable bits using a novel method based on the principles of combinatorial innovation (see, e.g., FIG. 6). In some embodiments, a second curation process 26 is configured to create hypothetical technology narratives that may be used to augment or train other artificial intelligences (see, e.g., FIG. 11).

The combination of the intelligent system 14, ML navigator 18, response generator 16 and the curated database 20 created by the curation processes 22 is a novel and unique feature of the technology search and repurposing system 10, augmenting the query processing system 12 and the query language 11 so the system can be used to search technology by intent or purpose. By comparison with the process described in FIG. 1, the invention augments the general search retrieval task in a way that is analogous to how yellow pages augmented the traditional phonebook.

As a consequence of this generative ability, the technology search and repurposing system 10 may be able to produce an answer 13 that suggests relevant problems or applications that were not known at the time the technology was input in the database and so had no reason to be listed in the original entry. Stated another way, the technology search and repurposing system 10 may be configured to formulate new purposes for existing technology. Thus, the technology search and repurposing system 10 may help users discover technologies by purpose or intent, and because the purpose itself may be inferred the technology search and repurposing system 10 may help a user repurpose technologies in previously unknown or unforeseeable manners. To achieve that goal the technology search and repurposing system 10 disclosed herein combines multiple novel processes and designs for curating data, training intelligent systems on queries, and generating responses with a combination of machine learning algorithms and natural language processing tools as depicted by way of example in FIG. 3.

By way of example, FIGS. 4-12 illustrate several components and of systems and/or methods to explore new uses for technology, produce technology-problem designs and augment and update databases and AI models used as part of the database curation process 22 of FIG. 3.

Figure 4:
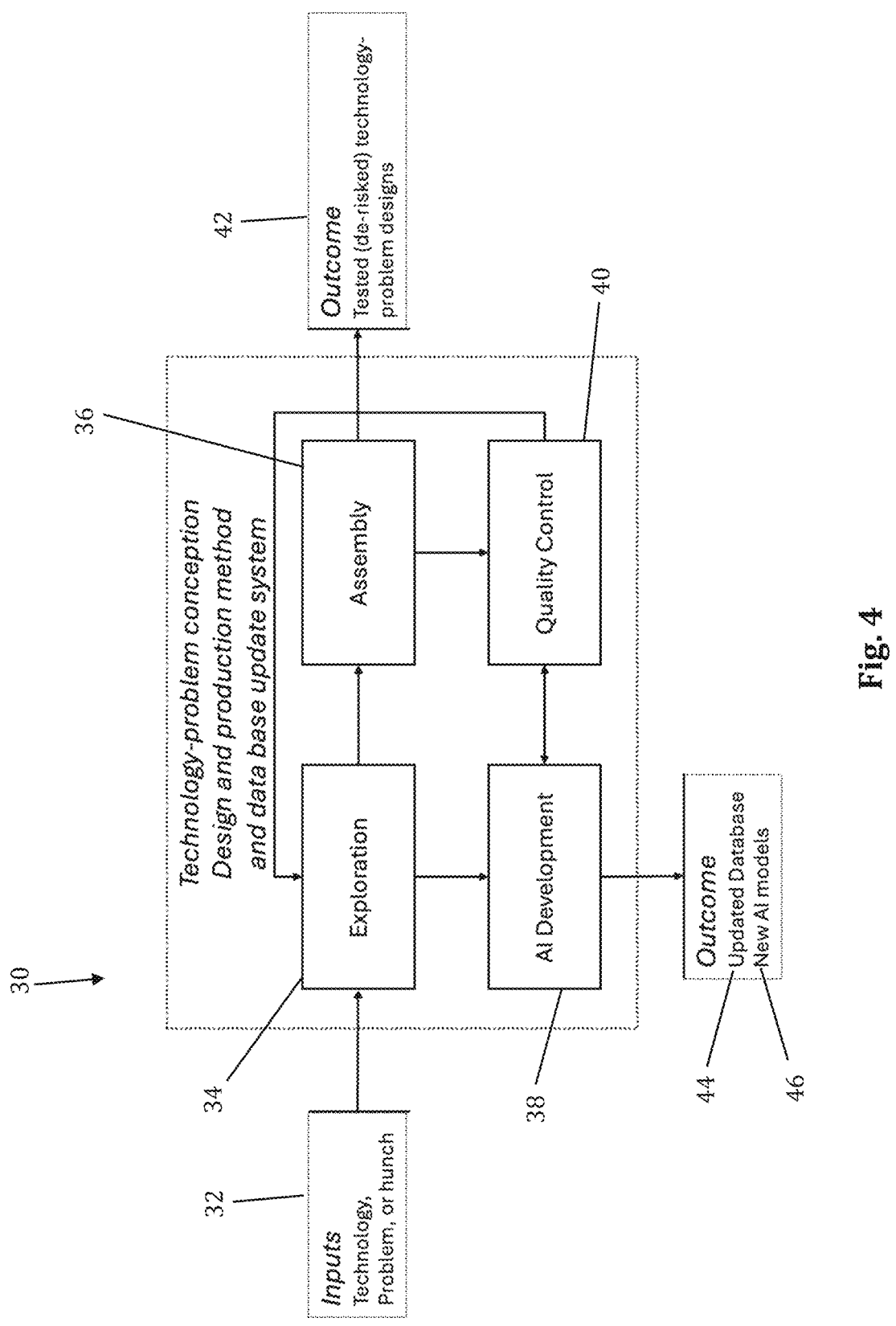
FIG. 4 is a block diagram depicting an example of a method to curate data and update models that the system of FIG. 3 may employ as part of the machine learning process, according to some embodiments.

FIG. 4 illustrates an example of a method 30 to curate data and update models that the system 10 may employ as part of the machine learning process. A key novelty is that the method 30 to curate data doubles as a method to conceive new technology organizations and thus, as is often described, "take technologies from lab to market or to impact". For this reason, the process may be implemented in numerous ways. In one embodiment the method 30 to curate data and update models may be implemented by the technology search and repurposing system 10 as a component in an Innovation/AI "factory" (like the one shown in FIG. 13). In some embodiments, method 30 to curate data and update models in whole or in part could be implemented as a crowdsourcing process. In some embodiments, the writing process 122 (a subcomponent of the AI development system) described in FIG. 11 could be implemented as a social network.

Thus, the method 30 to curate data and update models as shown in FIG. 4 illustrates a method to create and update the database 20 and a method of production of new technology-problem concepts and designs. The method 30 takes a technology or a problem as an input 32 and goes through several processes (e.g., an exploration process 34, assembly process 36, AI development process 38, and a quality control process 40). By way of example, the exploration process 34 is further described in conjunction with FIG. 5, the assembly process 36 is described in conjunction with FIG. 9, the AI development process 38 is described in conjunction with FIG. 10, and the quality control process 40 is described in conjunction with FIG. 12. In some embodiments, the method to create and update the database 20 shown in FIG. 4 has several key outcomes, including but not limited to (and by way of example only) testable designs 42, curated database 44, and new AI models 46. In some embodiments, the testable technology-problem designs 42 range from new companies to kits.

Figure 5:
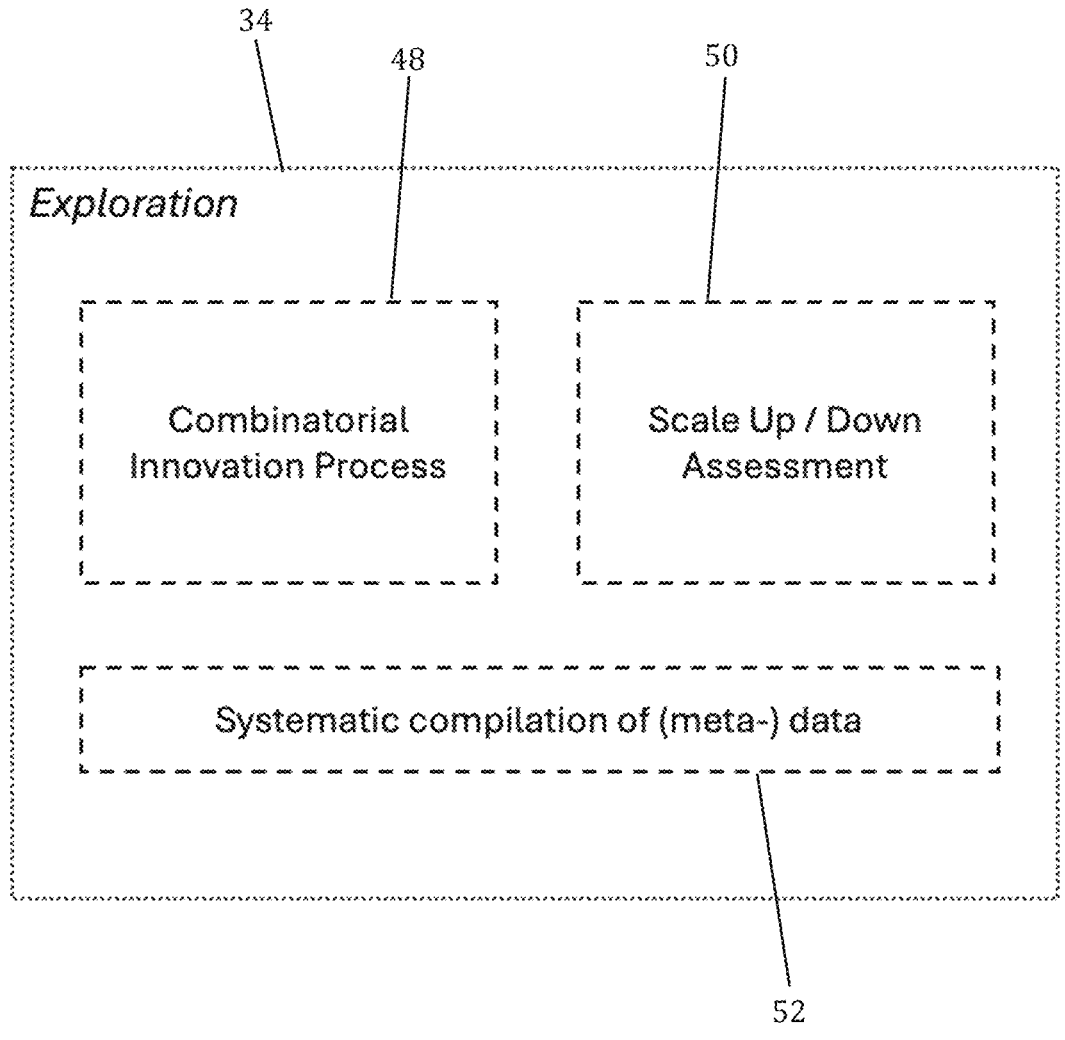
FIG. 5 is a block diagram depicting an example of an exploration process forming part of the method of FIG. 4, according to some embodiments.

Thus, in addition to helping update the database and AI models (AI Development), the method to create and update the database 20 doubles as a process to produce new designs for how technology may be used to solve a problem (e.g., as part of the exploration process 34, described in FIG. 5). In some embodiments, the designs produced are testable and may be tested at different scales (e.g., as part of the assembly process 36, described in FIG. 9). In some embodiments, the tests may be subjected to a quality control process 40 that informs new explorations and AI development.

Figure 6:
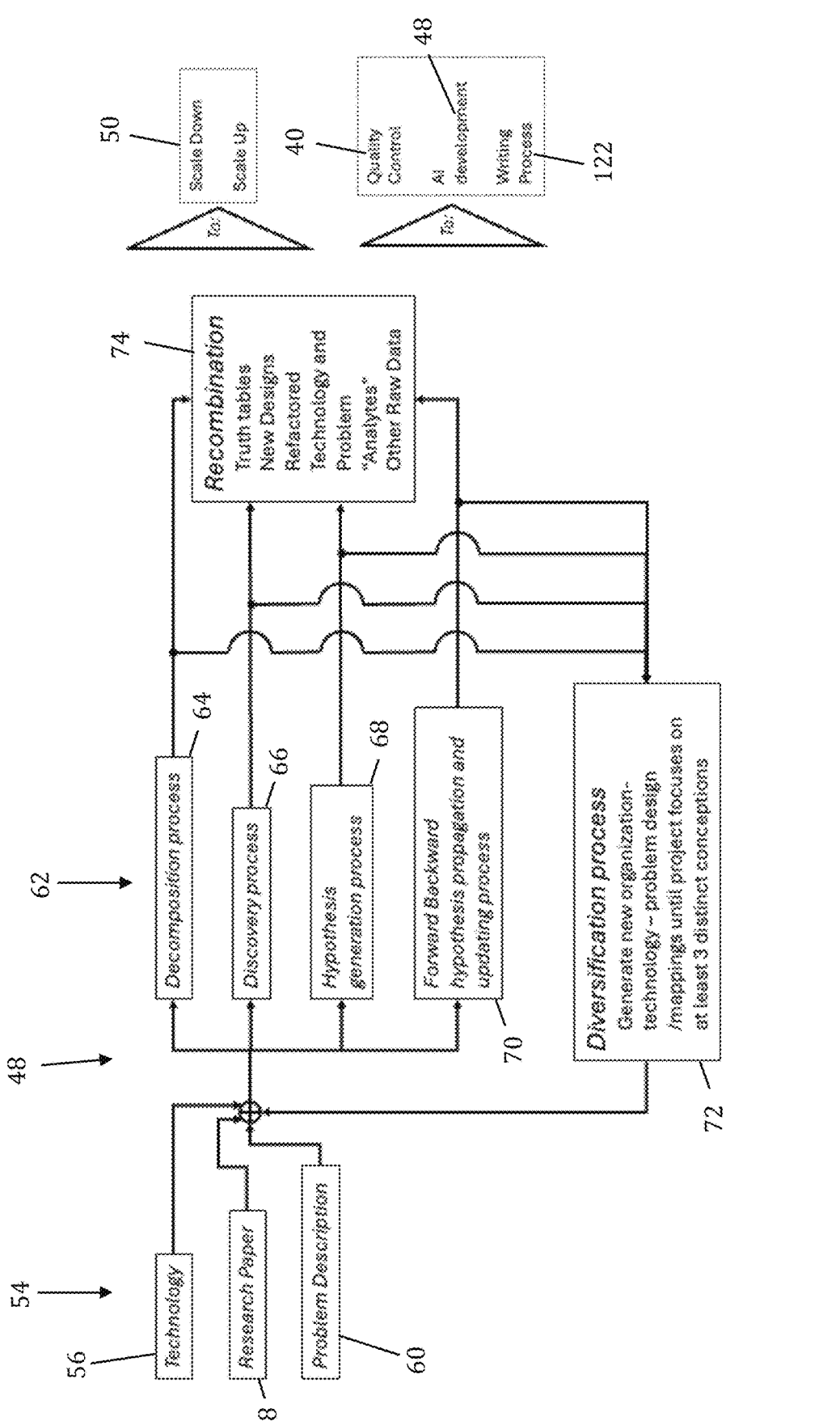
FIG. 6 is a block diagram depicting an example of a combinatorial innovation process forming part of the exploration process of FIG. 5, according to some embodiments.
Figure 7:
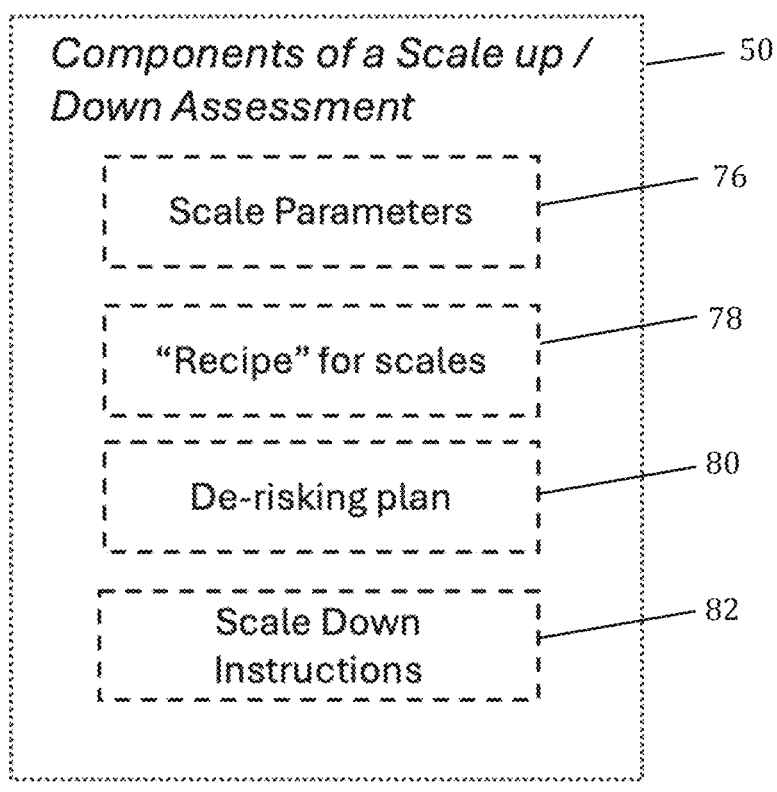
FIG. 7 is a block diagram depicting an example of a scale up/down assessment process forming part of the exploration process of FIG. 5, according to some embodiments.

Referring now to FIG. 5, in some embodiments the exploration process 34 comprises sub processes including a combinatorial innovation process 48 (FIG. 6), and a Scale Up/Scale Down assessment 50 (FIG. 7).

By way of example, compared to processes tasked with exploring new applications for technology, a key novelty of the exploration process 34 disclosed herein is that it is configured to enable the systematic compilation of data 52 (e.g., described in FIG. 8). This new data compilation enables the technology to be viewed as a sum of constitutive components through various lenses and can be used in the AI development process 38 and database curation processes 22 described in FIGS. 3 and 4.

With reference to FIG. 6, the combinatorial innovation process 48 describes a way to decompose a new technology or problem into bits or analytes that can be recombined to suggest new uses or new organizational models. By way of example only, FIG. 6 shows the combinatorial innovation process 48 as a circuit. In some embodiments, the input 54 can be a technology 56, a research paper 58, or a problem description 60, or a hunch about any of them. The input 54 is then analyzed through one or more processes referred to as the "forward processes" 62. Each forward process 62 gives a different perspective over the technology. In some embodiments, a "decomposition process" 64 helps decompose the technology into features or attributes susceptible to recombination, a "discovery process" 66 helps unearth new scenarios and contexts for the technology, a "hypothesis generation process" 68 helps formulate concrete manifestations and embodiments of the technology, and a "forward backward hypothesis propagation and updating process" 70 helps uncover market adjacencies and proofs of concepts. In some embodiments, these processes may be implemented as practice sheets. In some embodiments these processes may be implemented as modules in computer software instructions that guide users through the process. In some embodiments, these processes may be implemented as instructions to populate several boards or navigate a "war room" or "virtual project room" or "discovery system".

Upon completion of the forward processes 62, the information obtained may be sent to a diversification process 72 where it is used to formulate new technology-problem organization designs. By way of example, to work most effectively the diversification process 72 needs to continue until there are at least three distinct conceptions. In some embodiments, following several iterations through the forward processes 62 and the diversification process 72, the information obtained is sent through a recombination process 74. This recombination process 74 yields a picture of the space of problems that may be addressed by an input technology or the space of technologies that may help address a given input problem. During the recombination process 74, one or more of the following items may be produced: truth table, new designs, refactored technology and problem "analytes." In some embodiments, these may all be produced following completion of the aforementioned processes and through inquiry consulting primary and secondary sources as needed. In some embodiments, upon completion of the recombination process 74, the recombined information the system 10 may move the information to the Scale Up/Scale Down assessment 50, the quality control process 40, the AI development process 38, and/or the writing process 122.

Referring now to FIG. 7, the scale/up down assessment 50 may be configured to explore the ways in which a hypothetical set of organizations designed to address a problem with technology may be scaled up or down to meet the challenge of solving a problem at different scales. In some embodiments, the scale/up down assessment 50 includes the considerations associated with the change of scale (e.g., scale parameters 76), the way in which scale affects the tasks to be performed by an organization (e.g., "recipe" for scales 78) as well as the tests that need to be performed to move the technology up the scale (e.g., de-risking plan 80) and illustrate the problem (e.g., scale-down instructions 82).

By way of example, the exploration process 34 is configured to help unearth new uses for a technology and to span the space of a problem. By design, the exploration process 34 creates a lot of reusable information. In some embodiments, the systematic data compilation process helps structure that created information so it may be reused to augment a database of technologies with information that point to latent information about usability that helps compare technologies across different fields. This comparability is key to developing AI models that do not need vast amounts of data to generalize and is a key novelty of the technology search and repurposing system 10 disclosed herein.

By way of example FIG. 8 is a table 84 showing that the data emerging from each exploration may be grouped into one of seven categories: 1) exploration data 86 coming from the forward and discovery processes from combinatorial innovation as described in FIG. 6; 2) references 88 gathered throughout the exploration; 3) instructions 90 to make a kit; 4) instructions 92 to scale up the project; 5) a de-risking plan 94 to test the idea for impact at large scale; 6) essays 96 describing the technology by its foreseeable impact (e.g., this is related to the writing process described in FIG. 11); and 7) lists and logs 98 containing assumptions, truth tables, etc. as they emerge through the exploration process 34.

In some embodiments, this information may be captured as a lab notebook. In some embodiments, this information may be captured with the help of apps or by inference as a user navigates a purpose-built room or augmented reality discovery system.

Figure 9:
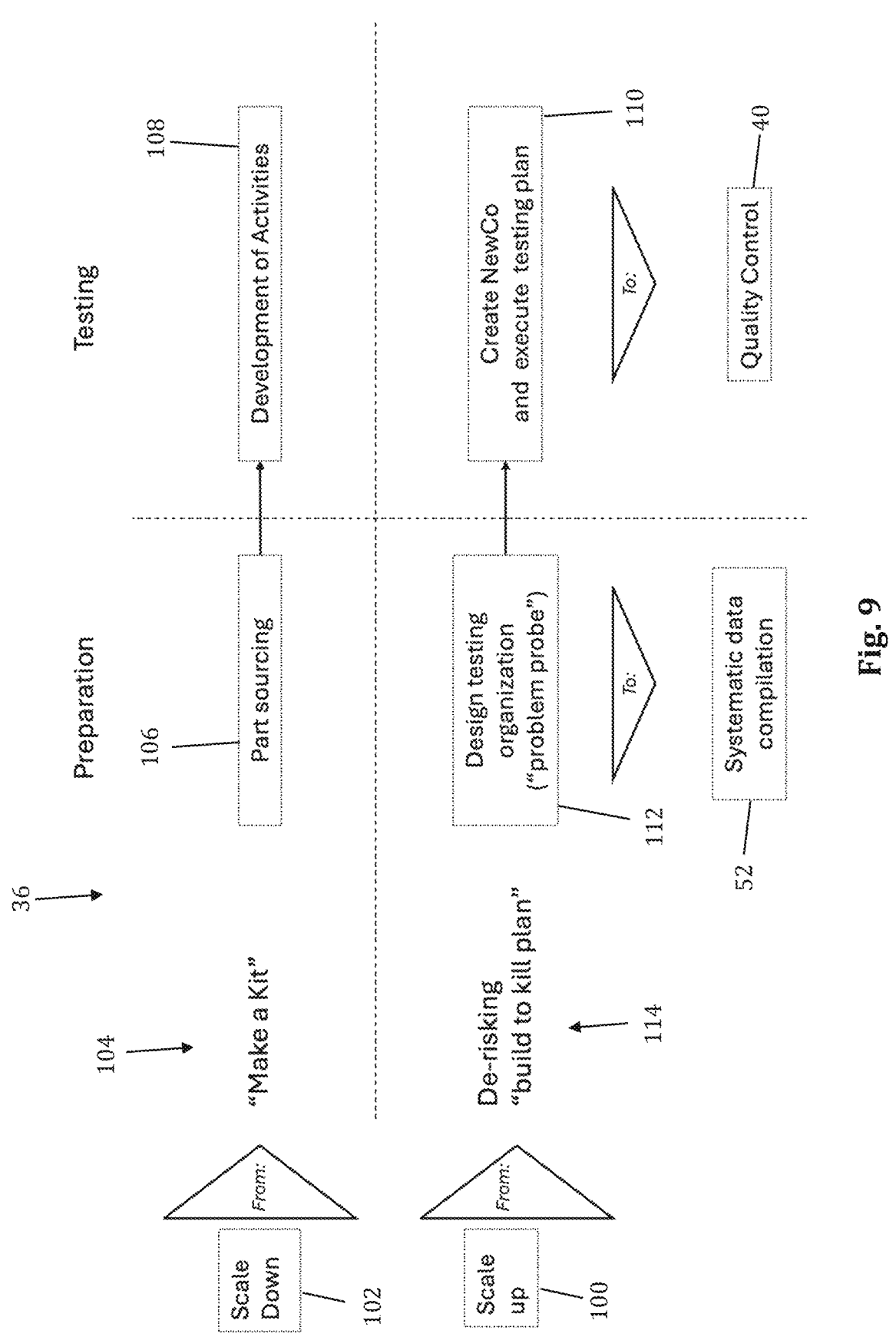
FIG. 9 is a block diagram depicting an example of an assembly process forming part of the method of FIG. 4, according to some embodiments.

By way of example, FIG. 9 describes the assembly process 36 according to some embodiments. As previously mentioned, in some embodiments, the result of an exploration process 34 may be a testable technology-problem design 42 (See, e.g., FIG. 4). In some embodiments, this testable technology-problem design 42 may have the appearance of a kit or the appearance of a plan to build a company. That is, it may scale up 100 an organization hypothesis to the next scale or scale down 102 to table scale.

If scaled down 102, the technology search and repurposing system 10 has recommended making a kit 104 and the key preparation steps require sourcing parts 106 and the testing may be accomplished by developing numerous activities 108 that the kit may be used for in order to illustrate a problem. If scaled up 100, the technology search and repurposing system 10 has recommended creating a new company 110 and the key preparation steps require designing a test plan for the organization 112. By way of example, this may be a "problem probe", which is a company built to "kill" the idea. The notion of killing your own idea is similar to what the military call "red teams" and others describe as adversarial testing. The testing steps entail executing the de-risking or "kill-your-idea" plan 114.

In some embodiments, information gathered through preparation and testing may be added to the systematic data compilation process 52 disclosed in FIG. 5. In some embodiments, information obtained through testing may undergo quality control 40 (See, e.g., FIG. 12).

Figure 10:
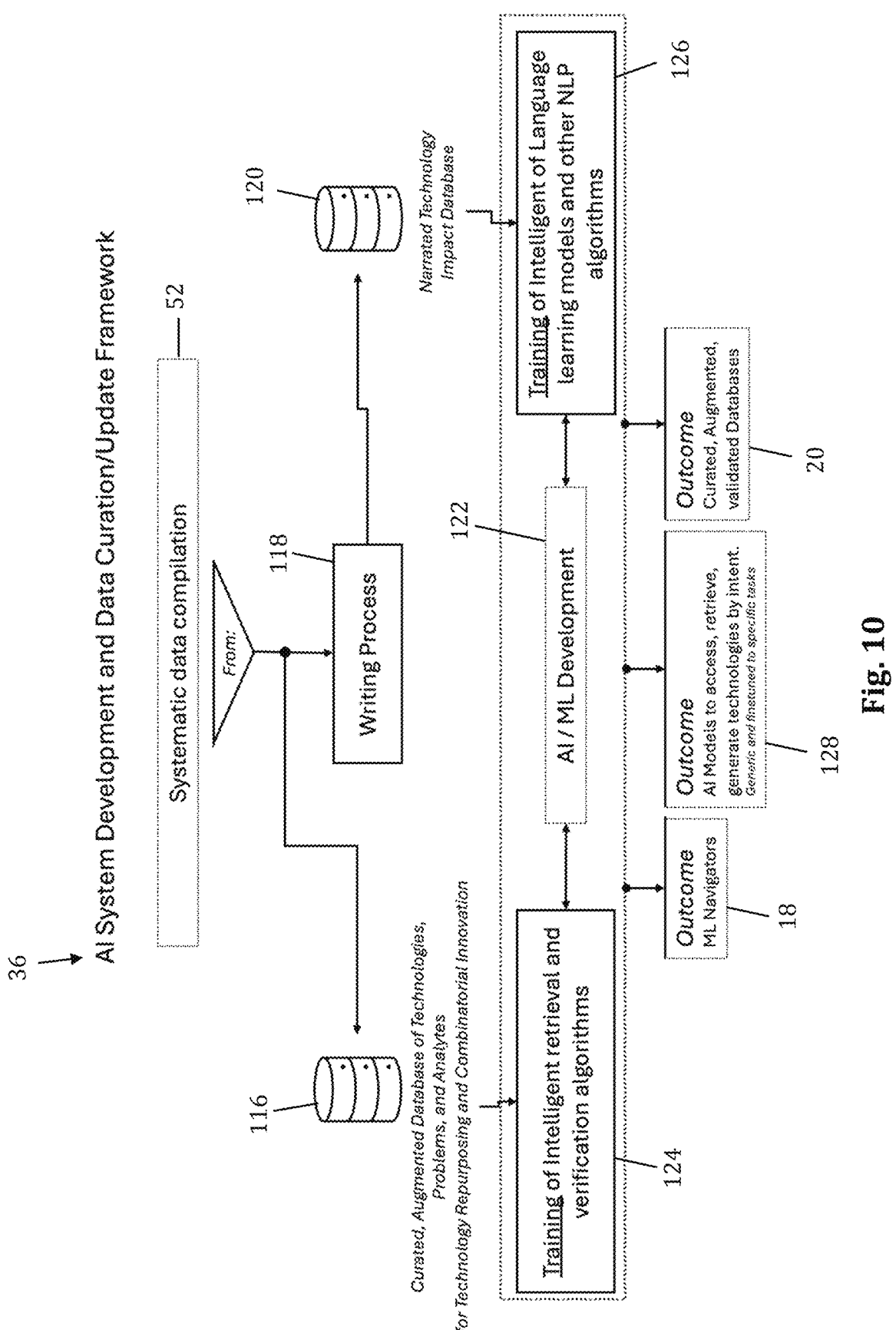
FIG. 10 is a block diagram depicting a data curation process and an example of how it may be used in an AI system development process forming part of the method of FIG. 4, according to some embodiments.

By way of example, FIG. 10 illustrates a portion of the workflow that is part of the AI system development process 38 and data curation 22 framework. In some embodiments, data coming from the systematic data compilation process 52 may be stored in an augmented database of technologies, problems and analytes 116. In some embodiments, data coming from the systematic data compilation process 52 may be routed through a writing process 118 (described FIG. 11), which yields stories that become the data in a narrated technology database 120. This first part of the AI development workflow updates two databases that are then used in AI and Machine Learning development 122 to train an intelligent system for search and retrieval 124 and an intelligent query system 126 such as a learning language model or other natural language processing (NLP) algorithm. In some embodiments, the outcome of the AI/Machine Learning development 122 may be threefold: an ML navigator 18 (e.g., FIG. 3), new AI models 128 to access technology by intent, and a family of augmented, curated technology databases 20 that have been validated.

Figure 11:
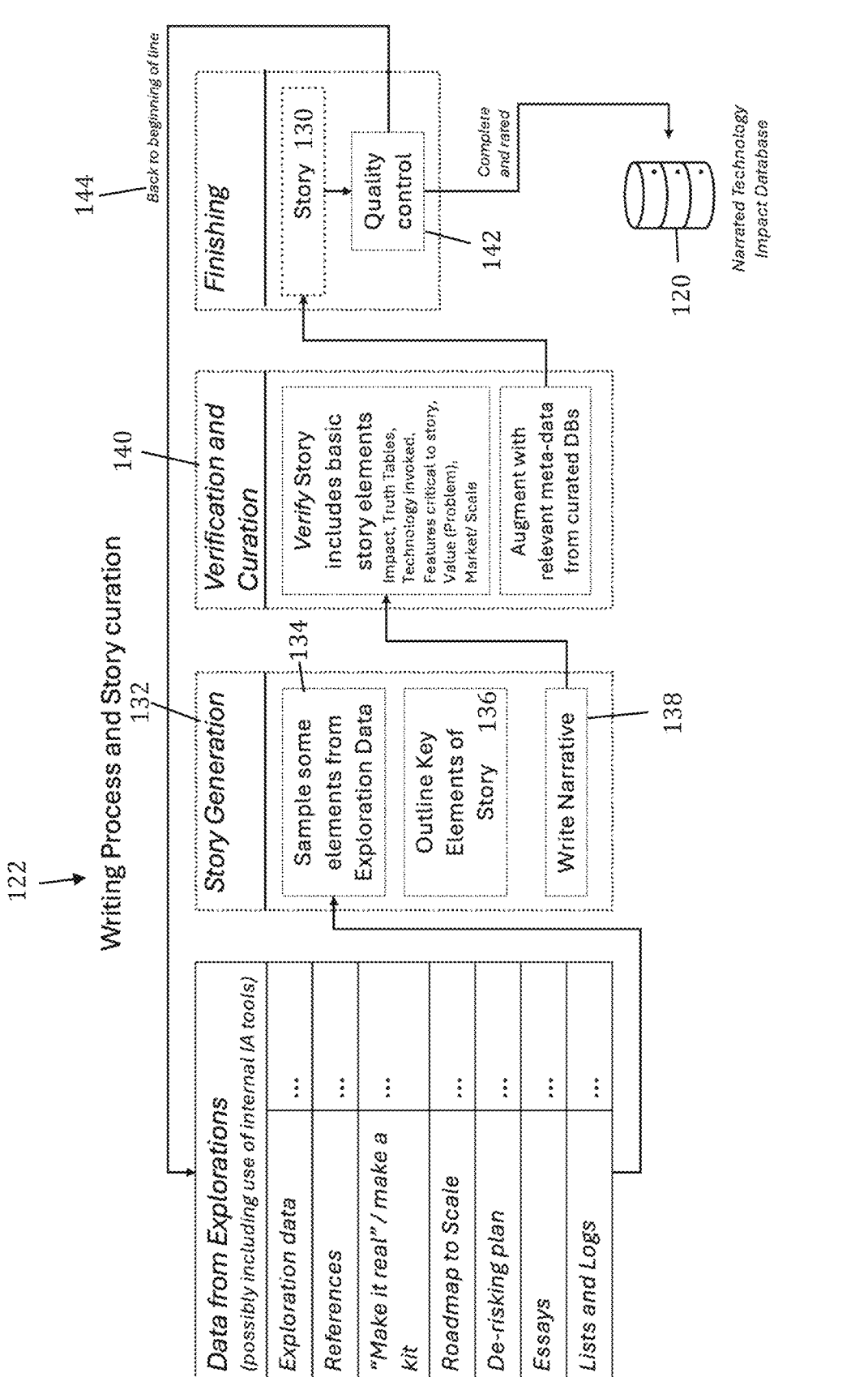
FIG. 11 is a block diagram depicting an example of a writing process forming part of the AI system development process of FIG. 4, according to some embodiments.

FIG. 11 illustrates a sample workflow of the writing process 122 that is part of the AI system development process 38 and data curation 22 framework disclosed above.

In some embodiments, the data produced via the systematic data compilation process 52 described in FIG. 9 is used to generate a fictional story 130. The purpose of writing stories 130 is to think of imaginative ways to use the data from explorations (e.g., including but not limited to decomposed technologies) to create new ways that technology (or components thereof) could be used even if it is in a fabricated world. These fictional stories may then be stored the narrated technology impact database 120 which is part of the technology search and repurposing system 10 and drawn upon to help enable the system 10 to suggest new uses for technology, or new combinations of technology. Because the story 130 entails speculating about how a technology helps address a seemingly preposterous problem in some world of fiction, one may argue that this is a science-fiction writing process. In some embodiments, the story 130 may be generated by a human alone or by a human assisted by a machine. By way of example, the story generation process 132 to generate a story 130 may include sampling a limited number of elements from the exploration data 134, outlining key elements of a story 136, and writing a narrative 138. Because the story 130 entails speculating about how a technology helps address a seemingly preposterous problem in some world of fiction, one may argue that this is a science-fiction writing process.

At the next step of the process each story is verified for completeness 140. The story 130 resulting from this process undergoes quality control 142. If unsuccessful the story is sent back to the beginning of the line 144 and if successful it is marked complete and rated (e.g., as human worthy, computer worthy, ok, not ok) and stored in the narrated technology impact database 120.

Figure 13:
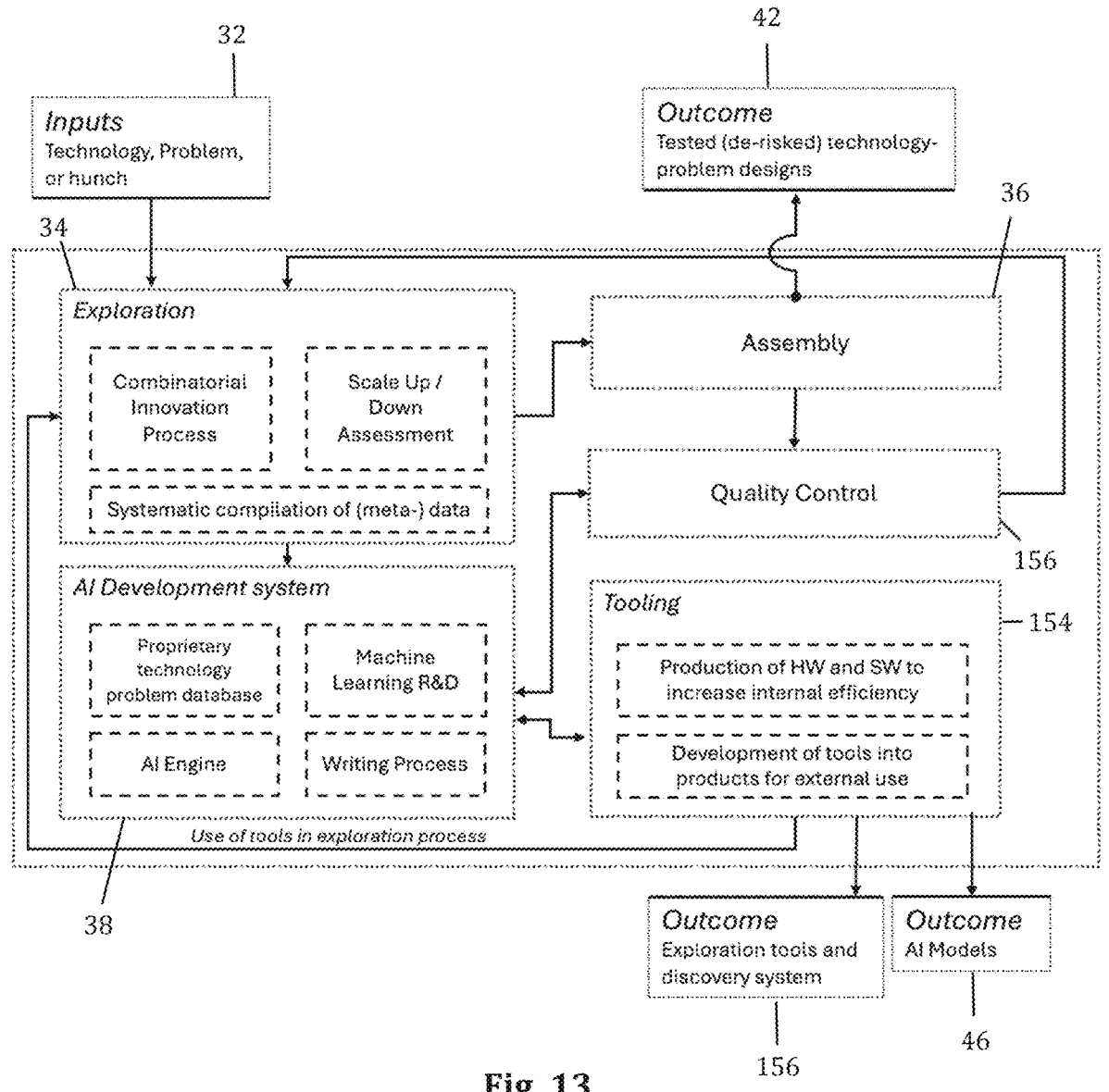
FIG. 13 is a block diagram depicting an example of an AI/Innovation "factory" enabled by the technology search and repurposing system of FIG. 3, according to some embodiments.

In one embodiment this writing process 122 may be implemented as a factory process (see, e.g., FIG. 13).

Figure 12:
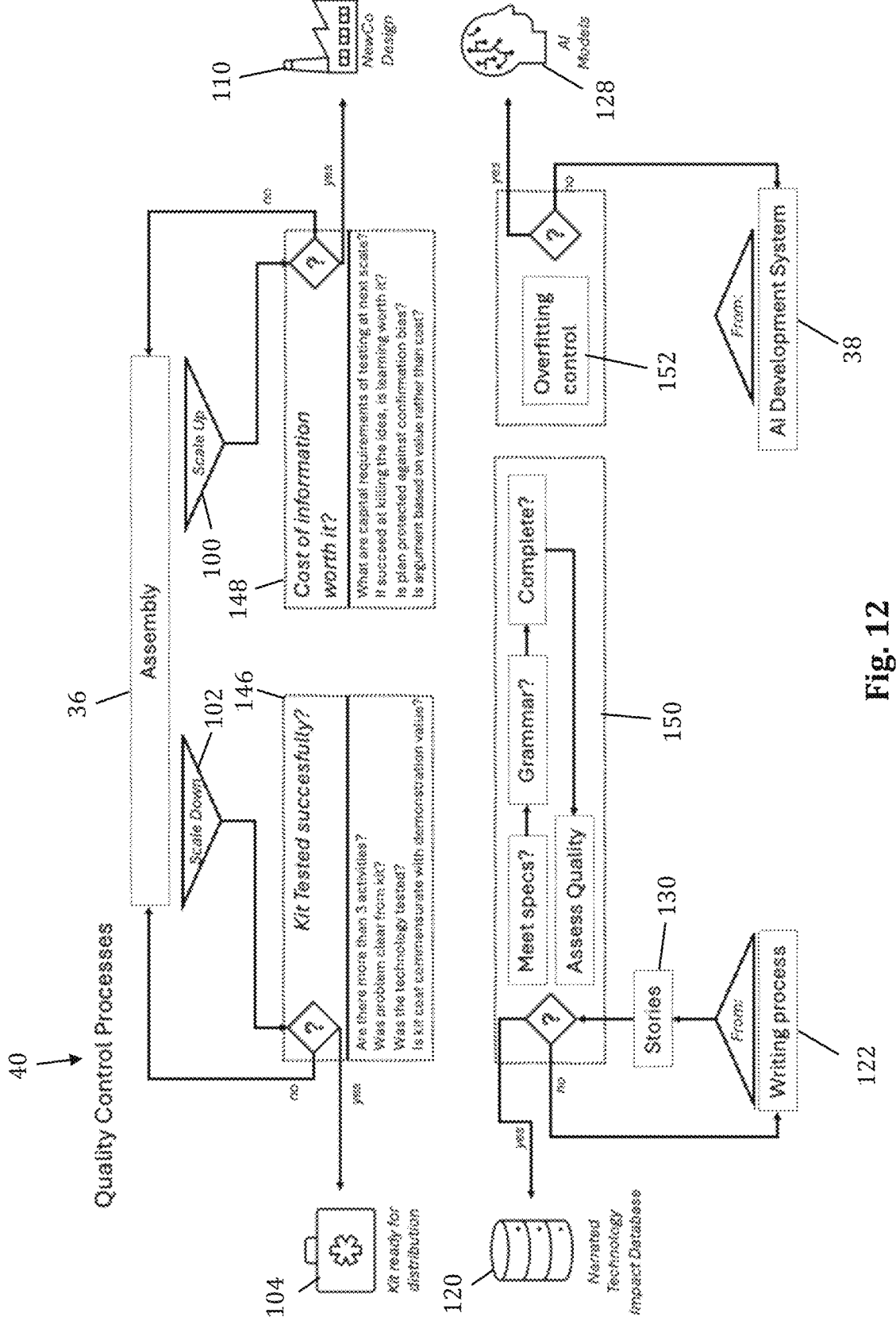
FIG. 12 is a block diagram depicting an example of a quality control process forming part of the method of FIG. 4, according to some embodiments.

By way of example, FIG. 12 describes four quality control processes 40 for testing kits 104, new company de-risking plans 110, stories 130 and AI models 128. The use of quality control paradigms for new company formation, writing and data curation, AI model development (to prevent overfitting) and in general to analyze technology-problem designs is a key novelty. By way of example, the quality control process 40 for a for a testing kit 104 may include starting with the scale-down recommendation 102 from the system 10 and determining whether the kit was tested successfully 146. By way of example, the quality control process 40 for a for a new company design 110 may include starting with the scale-up recommendation 100 from the system 10 and determining whether the cost of information was worth it 148. By way of example, the quality control process 40 for a for a writing process 122 may include starting with the generated story 130 and assessing the quality 150 by determining if the generated story meets the required specifications, uses proper grammar, and/or is complete. By way of example, the quality control process 40 for a for the AI models 128 may include controlling for overfitting 152.

By way of example, FIG. 13 discloses an AI/Innovation "factory" that may be enabled by the technology search and repurposing system 10 disclosed herein.

In some embodiments, the various processes described above and more broadly, the elements that constitute the system 10 may be structured as a production factory. The figure shows each of the elements (Exploration 34, Assembly 36, Quality Control 40, and AI Development 38) outlined in previous figures as well as many of the corresponding sub elements (Combinatorial Innovation, Scale Up/Down assessment, Systematic Data Compilation, Databases, Machine Learning R&D, AI Engine, and writing process) and how the elements relate to each other. In addition, the factory embodiment introduces a new process of tooling 154 seen as an activity to produce hardware and software that can be used to increase the efficiency of the other aspects of the factory and may be further developed into products.

The factory embodiment described in this figure takes technologies, problems and hunches as inputs 32 and leads to three products and by products: Tested (de-risked) technology-problem designs 42 (such as new companies or kits), new AI models 46, and a new set of exploration tools and a discovery system 156.

Figure 14:
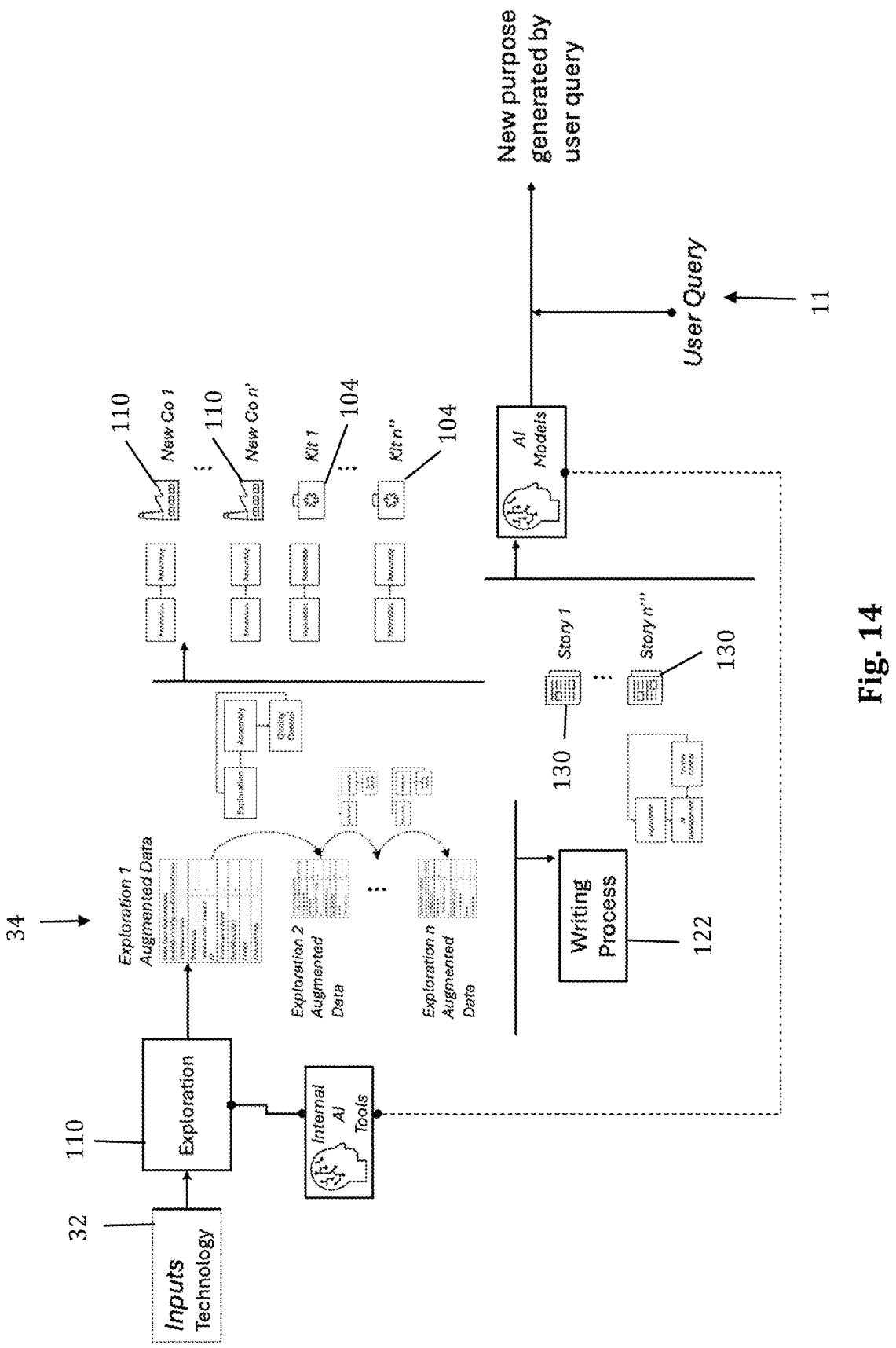
FIG. 14 is a block diagram depicting a technology repurposing process as seen through the life cycle of an input technology that undergoes multiple recycling and repurposing cycles that ends up becoming a component of multiple new companies, according to some embodiments.

By way of example, FIG. 14 illustrates the technology repurposing process as seen through the life cycle of an input technology 32 that undergoes multiple recycling and repurposing cycles that ends up becoming a component of multiple new companies 110 and kits 104 through combinatorial innovation. The diagram shows the benefits of the system: Each technology may undergo one or multiple explorations 34; each technology may similarly lead to multiple new organizations 110. Any one technology, regarding of the number of times it is explored, is also expected to become a component in multiple stories 130 by way of the writing process 122. All the information generated becomes part of the various databases used in the generation of AI models that are used internally and in search systems made available for external users.

A user may thus identify a new purpose for a technology and retrieve a technology with a query 11 about a problem that speaks to a domain of application that may or may not have been identified in the original patent, paper or technology report.

Figure 15:
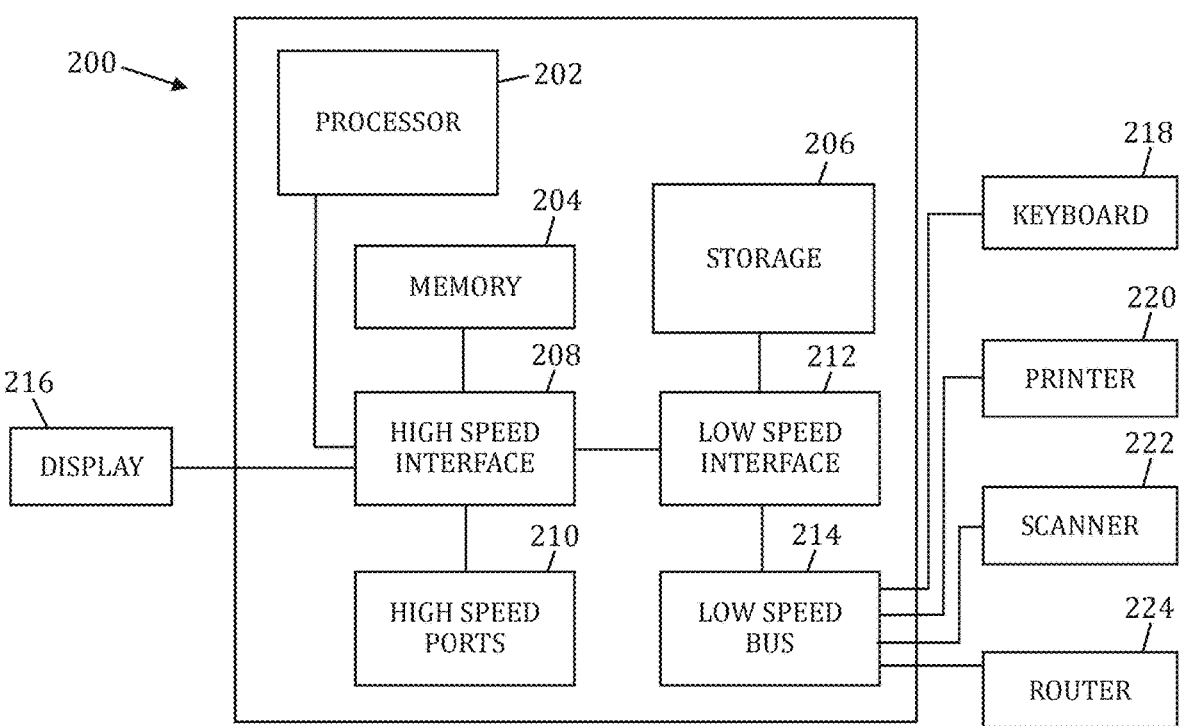
FIG. 15 is a block diagram illustrating example computer system with which any of the devices or systems described herein may be implemented, according to some embodiments.
Figure 16:
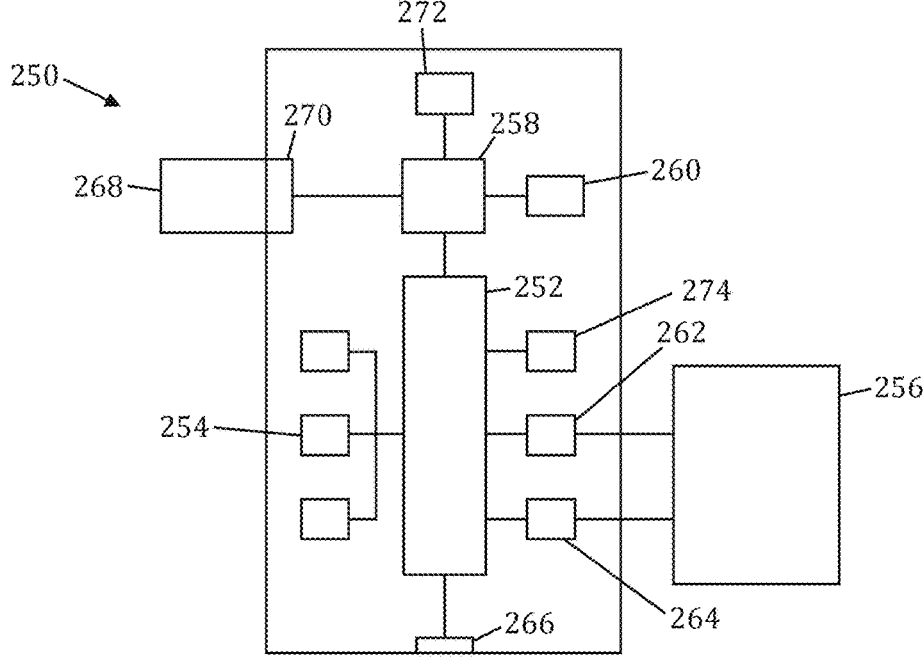
FIG. 16 is a block diagram illustrating example mobile computer system with which any of the devices or systems described herein may be implemented, according to some embodiments.

FIGS. 15-16 are example block diagrams of computer-implemented electronic devices 200, 250 that may be used to implement the technology search and repurposing system 10 and related methods described in this disclosure, as either a client or as a server or plurality of servers. Computing device 200 is intended to represent various forms of digital computers, such as laptops, desktops, workstations, personal digital assistants, servers, blade servers, mainframes, and other appropriate computers. Computing device 250 is intended to represent various forms of mobile devices, such as personal digital assistants, cellular telephones, smartphones, augmented reality headwear, virtual reality headwear, and other similar computing devices. In this example, either of computing device 200, 250 may represent query processing system 12, and/or computing systems that serve as the cloud referenced in this disclosure. The components shown here, their connections and relationships, and their functions, are meant to be examples only, and are not meant to limit implementations described and/or claimed in this document.

Referring to FIG. 15, computing device 200 includes a processor 202, memory 204, a storage device 206, a high-speed interface 208 connecting to memory 204 and high-speed expansion ports 210, and a low-speed interface 212 connecting to low-speed bus 214 and storage device 206. Each of the components 202, 204, 206, 208, 210, and 212, are interconnected using various busses, and may be mounted on a common motherboard or in other manners as appropriate. The processor 202 can process instructions for execution within the computing device 200, including instructions stored in the memory 204 or on the storage device 206 to display graphical information for a graphic user interface (GUI) on an external input/output device, such as display 216 coupled to high-speed interface 208. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

The memory 204 stores information within the computing device 200. By way of example only, the memory 204 may be a volatile memory unit, non-volatile memory unit, or another form of computer-readable medium, such as a magnetic or optical disk (for example).

The storage device 206 is capable of providing mass storage for the computing device 200. In one implementation, the storage device 206 may be or contain a non-transitory computer-readable medium (e.g., any and all computer-readable media except transitory, propagating signals), such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, or memory on processor 202.

The high-speed interface 208 manages bandwidth-intensive operations for the computing device 200, while the low-speed interface 212 manages lower bandwidth-intensive operations. Such allocation of functions is by way of example only. In one implementation, the high-speed interface 208 is coupled to memory 204, display 216 (e.g., through a graphics processor or accelerator), and to high-speed expansion ports 210, which may accept various expansion cards (not shown). In the implementation, low-speed interface 212 is coupled to storage device 206 and low-speed expansion port 214. The low-speed expansion port may include various communication ports (e.g., USB, Bluetooth, Ethernet, wireless Ethernet) and may be coupled to one or more input/output devices, such as a keyboard 218, a printer 220, a scanner 222, or a networking device such as a switch or router 224, e.g., through a network adapter.

The computing device 200 may be implemented in a number of different forms. For example, it may be implemented as a standard server, or multiple times in a group of such servers. It may also be implemented as part of a rack server system. In addition, it may be implemented in a personal computer such as a laptop computer. Alternatively, components from computing device 200 may be combined with other components in a mobile device, such as device 250 (FIG. 16). Each of such devices may contain one or more of computing device 200, 250, and an entire system may be made up of multiple computing devices 200, 250 communicating with each other.

Referring to FIG. 16, computing device 250 includes a processor 252, memory 254, an input/output device such as a display 256, a communication interface 258, and a transceiver 260, among other components. The device 250 may also be provided with a storage device, such as a microdrive or other device, to provide additional storage. Each of the components 250, 252, 254, 256, 258, and 260, are interconnected using various buses, and several of the components may be mounted on a common motherboard or in other manners as appropriate.

The processor 252 can execute instructions within the computing device 250, including instructions stored in the memory 254. The processor may be implemented as a chipset of chips that include separate and multiple analog and digital processors. Additionally, the processor may be implemented using any of a number of architectures. For example, the processor 252 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 250, such as control of user interfaces, applications run by device 250, and wireless communication by device 250.

The processor 252 may communicate with a user through control interface 262 and display interface 264 coupled to a display 256. The display 256 may be, for example, a TFT (Thin-Film-Transistor Liquid Crystal Display) display or an OLED (Organic Light Emitting Diode) display, or other appropriate display technology. The display interface 264 may comprise appropriate circuitry for driving the display 256 to present graphical and other information to a user. The control interface 262 may receive commands from a user and convert them for submission to the processor 252. In addition, an external interface 266 may be provided in communication with processor 252, so as to enable near area communication of device 250 with other devices. External interface 266 may provide, for example, for wired communication in some implementations, or for wireless communication in other implementations, and multiple interfaces may also be used.

The memory 254 stores information within the computing device 250. The memory 254 can be implemented as one or more of a computer-readable medium or media, a volatile memory unit or units, or a non-volatile memory unit or units. Expansion memory 268 may also be provided and connected to device 250 through expansion interface 270, which may include, for example, a SIMM (Single In Line Memory Module) card interface. Such expansion memory 268 may provide extra storage space for device 250 or may also store applications or other information for device 250. Specifically, expansion memory 268 may include instructions to carry out or supplement the processes described above, and may include secure information also. Thus, for example, expansion memory 268 may be provided as a security module for device 250, and may be programmed with instructions that permit secure use of device 250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, cause performance of one or more methods, such as those described above. The information carrier is a computer- or machine-readable medium, such as the memory 254, expansion memory 268, or memory on processor 252 that may be received, for example, over transceiver 260 or external interface 266.

Device 250 may communicate wirelessly through communication interface 258, which may include digital signal processing circuitry where necessary. Communication interface 258 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 260. In addition, short-range communication may occur, such as using a Bluetooth, WiFi, or other such transceiver (not shown). In addition, GPS (Global Positioning System) receiver module 272 may provide additional navigation- and location-related wireless data to device 250, which may be used as appropriate by applications running on device 250.

Device 250 may also communicate audibly using audio codec 274, which may receive spoken information from a user and convert it to usable digital information. Audio codec 274 may likewise generate audible sound for a user, such as through a speaker, e.g., in a handset of device 250. Such sound may include sound from voice telephone calls, may include recorded sound (e.g., voice messages, music files, etc.) and may also include sound generated by applications operating on device 250.

The computing device 250 may be implemented in a number of different forms, some of which are shown in the figure. For example, it may be implemented as a cellular telephone. It may also be implemented as part of a smartphone, personal digital assistant, or other similar mobile device.

Additionally computing device 200 or 250 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way but may also be configured in ways that are not listed.

All patents and publications mentioned in this specification are indicative of the levels of those skilled in the art to which the disclosure pertains. It is to be understood that while a certain form of the disclosure is illustrated, it is not to be limited to the specific form or arrangement herein described and shown. It will be apparent to those skilled in the art that various changes may be made without departing from the scope of the disclosure and the disclosure is not to be considered limited to what is shown and described in the specification and any drawings/figures included herein.

One skilled in the art will readily appreciate that the present disclosure is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the disclosure and are defined by the scope of the appended claims. Although the disclosure has been described in connection with specific preferred embodiments, it should be understood that the disclosure as claimed should not be unduly limited to such specific embodiments. Indeed, various modifications of the described modes for carrying out the disclosure which are obvious to those skilled in the art are intended to be within the scope of the following claims.

What is claimed is:

1. A method for curating a technology database, comprising:

receiving an input query from a user;

applying an exploration process to said input query, said exploration process resulting in a systematic compilation of data;

applying an artificial intelligence development process to said systematic compilation of data, said artificial intelligence development process including the steps of:

sorting a first group of said systematic compilation of data into a curated, augmented database of technologies, problems, and analytes for technology repurposing an combinatorial innovation;

sorting a second group of said systematic compilation of data through a writing process and into a narrated technology impact database;

performing artificial intelligence/machine learning development, said artificial intelligence/machine learning development comprising:

training of intelligent retrieval and verification algorithms; and training of intelligent language learning models and other NLP algorithms;

wherein a first outcome is one or more curated, augmented, and validated technology database.

2. The method of claim 1, wherein the input query is a technology, problem, or a hunch.

3. The method of claim 1, wherein said outcome is a curated database.

4. The method of claim 1, wherein the outcome is a new artificial intelligence model.

5. The method of claim 1, wherein the outcome is one or more tested technology-problem designs.

6. The method of claim 1, wherein a second outcome is generation and/or training of machine learning navigators.

7. The method of claim 1, wherein a second outcome is generation and/or training of artificial intelligence models to access, retrieve, or generate technologies by intent.

8. The method of claim 7, wherein the artificial intelligence models are fine-tuned to a specific task.

9. The method of claim 7, wherein the artificial intelligence models are configured to perform generic tasks.

10. The method of claim 1, wherein the writing process comprising generating one or more fictional stories comprising a narrative about using technology or fragments of technology within said second group of systematic compilation of data in a new manner.

11. The method of claim 1, wherein the writing process further includes the steps of:

sampling elements from exploration data;

outline key elements of a story;

write the narrative;

verify the story includes basic story elements;

augment story with relevant meta-data from the curated database; and performing a quality control process on said verified, augmented story.

* * * * *